(12) United States Patent
Koch et al.

(10) Patent No.: US 10,603,740 B2
(45) Date of Patent: Mar. 31, 2020

(54) METHOD OF JOINING BY ELECTRON BEAM OR LASER WELDING A TURBOCHARGER TURBINE WHEEL TO A SHAFT; CORRESPONDING TURBOCHARGER TURBINE WHEEL

(71) Applicant: BorgWarner Inc., Auburn Hills, MI (US)

(72) Inventors: Silvio Koch, Kircheimbolanden (DE); Stefan Eisinger, Bornheim (DE)

(73) Assignee: BorgWarner Inc., Auburn Hills, MI (US)

( * ) Notice: Subject to any disclaimer, the term of this patent is extended or adjusted under 35 U.S.C. 154(b) by 138 days.

(21) Appl. No.: 15/549,286

(22) PCT Filed: Jan. 22, 2016

(86) PCT No.: PCT/US2016/014503
§ 371 (c)(1),
(2) Date: Aug. 7, 2017

(87) PCT Pub. No.: WO2016/130300
PCT Pub. Date: Aug. 18, 2016

(65) Prior Publication Data
US 2018/0036831 A1     Feb. 8, 2018

Related U.S. Application Data

(60) Provisional application No. 62/113,608, filed on Feb. 9, 2015.

(51) Int. Cl.
B23K 15/00         (2006.01)
B23K 26/32         (2014.01)
(Continued)

(52) U.S. Cl.
CPC ...... B23K 15/0053 (2013.01); B23K 15/0093 (2013.01); B23K 26/28 (2013.01);
(Continued)

(58) Field of Classification Search
CPC .............. B23K 15/0053; B23K 15/006; B23K 15/0086; B23K 15/0093; B23K 15/0046
(Continued)

(56) References Cited

U.S. PATENT DOCUMENTS 4,942,999 A * 7/1990 Oda ...................... C04B 37/026
                                                                    228/118
2004/0057834 A1* 3/2004 Shimizu .................. F01D 5/025
                                                                    416/244 A
2013/0209164 A1   8/2013 Bird et al.

FOREIGN PATENT DOCUMENTS

CN        104169516 A       11/2014
JP         02127986 A        5/1990
(Continued)

OTHER PUBLICATIONS

International Search Report and Written Opinion dated May 9, 2016, in International Application No. PCT/US2016/014503.
(Continued)

*Primary Examiner* — Ninh H. Nguyen
*Assistant Examiner* — Jason Mikus
(74) *Attorney, Agent, or Firm* — Eric L. Doyle; Stephan A. Pendorf; Patent Central LLC

(57) ABSTRACT

A turbocharger wheel (4) and shaft (1) assembly exhibits a frustoconical geometry of welding zone contact surfaces extending to the outer circumference of the shaft (1). This frustoconical geometry not only allows continuous centering of the parts (1, 4) during joining, it also eliminates the problem of stress propagation along a plane. The location of the electron beam is shifted so that only the radially outer (Continued)

segment of the frustoconical contact surface is joined by welding, leaving a radially inner unmelted and unfused zone for maintaining firm contact of the oblique surfaces.

10 Claims, 6 Drawing Sheets

(51) Int. Cl.
    *F01D 5/02*     (2006.01)
    *F01D 5/06*     (2006.01)
    *B23K 26/282*     (2014.01)
    *F16D 1/027*     (2006.01)
    *B23K 33/00*     (2006.01)
    *B23K 26/28*     (2014.01)
    *B23K 101/00*     (2006.01)

(52) U.S. Cl.
    CPC ............ *B23K 26/282* (2015.10); *B23K 26/32* (2013.01); *B23K 33/006* (2013.01); *B23K 33/008* (2013.01); *F01D 5/025* (2013.01); *F01D 5/063* (2013.01); *F16D 1/027* (2013.01); *B23K 2101/001* (2018.08); *B23K 2101/003* (2018.08); *B23K 2101/006* (2018.08); *F05D 2220/40* (2013.01); *F05D 2230/233* (2013.01); *F05D 2230/234* (2013.01)

(58) Field of Classification Search
    USPC ..................................................... 416/244 A
    See application file for complete search history.

(56) References Cited

FOREIGN PATENT DOCUMENTS

JP     2001087887 A     3/2001
JP     2012061496 A     3/2012

OTHER PUBLICATIONS

Chinese Office Action (with English language translation) dated Mar. 25, 2019, in Chinese Applicaion No. 201680008219.3.
Second Chinese Office Action (with English language translation) dated Sep. 20, 2019, in Chinese Application No. 201680008219.3.

* cited by examiner

METHOD OF JOINING BY ELECTRON BEAM OR LASER WELDING A TURBOCHARGER TURBINE WHEEL TO A SHAFT; CORRESPONDING TURBOCHARGER TURBINE WHEEL

BACKGROUND OF THE INVENTION

Field of the Invention

The invention provides a new geometry of contact surfaces between a turbine wheel and shaft, preferably for a turbocharger, allowing continuous centering of the parts during the welding process.

Description of the Related Art

Turbochargers operate at very high rotational speed, up to 80,000 RPM for large turbochargers and up to 300,000 RPM for small turbochargers. The exhaust gases driving the turbine wheels may range from 740° C. to 1050° C., depending on the type of combustion in the engine. Therefore a turbine wheel and shaft are constructed of high strength, high temperature resistant metals able to withstand centrifugal loading and temperature variations without experiencing significant deformation (which could alter balance, introduce noise, reduce assembly life, etc.).

It is known to join the wheel and shaft using an inertia friction welding technique in which a shaft may be coupled to a fly wheel that accumulates kinetic energy from rotation at a fixed speed, and this rotating shaft is thrust against a stationary turbine wheel. Friction heat is generated as the two surfaces rub together to form a weld. Various limitations included in the inertia friction welding process include the generation of flash coat that must be removed through post welding machining. Additionally, the flash may be trapped inside a cylindrical joint requiring a greater effort to balance the wheel shaft assembly after the joining operation. Further, high thrust pressures necessitates the use of large, rigid and expensive machinery.

It is also known to utilize an electron beam welding process to join a turbine wheel and shaft assembly. Electron beam (EB) welding utilizes a high power density beam which is focused on a joint in a vacuum. The electron beam produces a deep narrow fusion zone with little weld distortion. Due to high quality weld with little distortion and less work for post-weld machining, EB is often chosen for high stress turbocharger applications.

Another energy beam-based technique involves one or more laser beams to deliver energy sufficient to weld components together. Gas lasers such as $CO_2$ lasers and solid state lasers such as Nd:YAG lasers can be used for welding a titanium turbine wheel and shaft.

Whether using electron beam welding or laser beam welding, the material melted by the beam shrinks during cooling after solidification, which may have unwanted consequences such as deformation and changes of shape of the product. There is a need to improve such a joining technique in order to reliably produce a joint with high joining accuracy.

Another potential danger is the emergence of cracks in the weld. Since the turbine wheel and shaft are rigid, the shrinkage of the weld produces high stress in the weld which may lead to transverse cracks along the surface of a weld seam (FIG. 6a) or longitudinal cracks in the direction of the depth of the weld (FIG. 6b). Further, residual stresses remaining in the region of the weld seam could lead to relaxation of the connection during operation of the turbocharger under the high thermal stress and centrifugal loading discussed above. This in turn results in an imbalance of the rotor, with associated noise emissions and increased wear.

U.S. Pat. No. 6,848,180 teaches that it is known to join a wheel and turbine shaft by (a) fitting a cylindrical protrusion formed at one end of one turbine shaft into a fitting hole formed in a turbine wheel for locating the parts radially (i.e., coaxial location), and (b) abutting one end of the turbine shaft against the turbine wheel at an abutment portion to locate the parts axially. The parts are then fused by electron beam welding of the entire periphery of the abutment portion. In the patent an improved joining method is taught, in which the part of the inner peripheral wall of the fitting hole of the turbine wheel is tapered inwardly, and the end of the turbine shaft to be joined to the wheel has a correspondingly tapered abutment portion. The contacting tapered surfaces ensure accurate coaxial and axial positioning and suppress deformation at the time of fusion. However, this design of the mating parts is complex with redundant dimensioning of mating parts. Further, welding takes place around the periphery of the contact zone at conventional planar abutment portions, resulting in welding stresses as discussed above, which may to lead to bending deformation.

Whether using electron beam welding or laser beam welding, the material melted by the beam shrinks during cooling after solidification, which may lead to deformation and changes of shape, depending on conditions. There is a need to provide a joining technique for joining a turbine wheel to a shaft with high joining accuracy and without deformation. There is a need for a joining technique which allows high strength and quality joints to be formed in an economic manner, while avoiding conditions leading to stress and crack formation in the joint.

SUMMARY OF THE INVENTION

The present invention was made is based in part upon the realization that the conventional planar geometry of contact surfaces at the weld joint between a turbine wheel and shaft introduce, on the one hand, the possibility of misalignment due to deformation during welding, and, on the other hand, a concentration of stresses in the two-dimensional plane of the joint, producing conditions favorable to crack formation.

The invention provides a new geometry of contact surfaces between a turbine wheel and shaft, allowing continuous centering of the parts during the welding process, and at the same time allowing dissipation of stresses in a three-dimensional space, whereby the resulting joint is highly accurate and less liable to distortion or cracking.

The invention is made by changing the geometry of the welding zone contact surfaces between a turbine wheel and shaft, that is, the outer peripheral circumferential contact area, from a planar geometry to an oblique or tapered (viewed in cross-section) or frustoconical (viewed in three dimensions) geometry. This frustoconical geometry not only allows continuous centering of the parts during joining, it also eliminates the problem of stress propagation along a plane since non-planar contact surfaces are welded. The invention further requires a modification of the electron beam so that the weld is neither as deep nor as narrow as conventional. Finally, the location of the electron beam is shifted so that only the outer or peripheral segment of the frustoconical contact surface zone is joined by welding, leaving an inner unmelted and unwelded zone for maintaining firm contact of the oblique surfaces throughout the welding process.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

Figure 7:
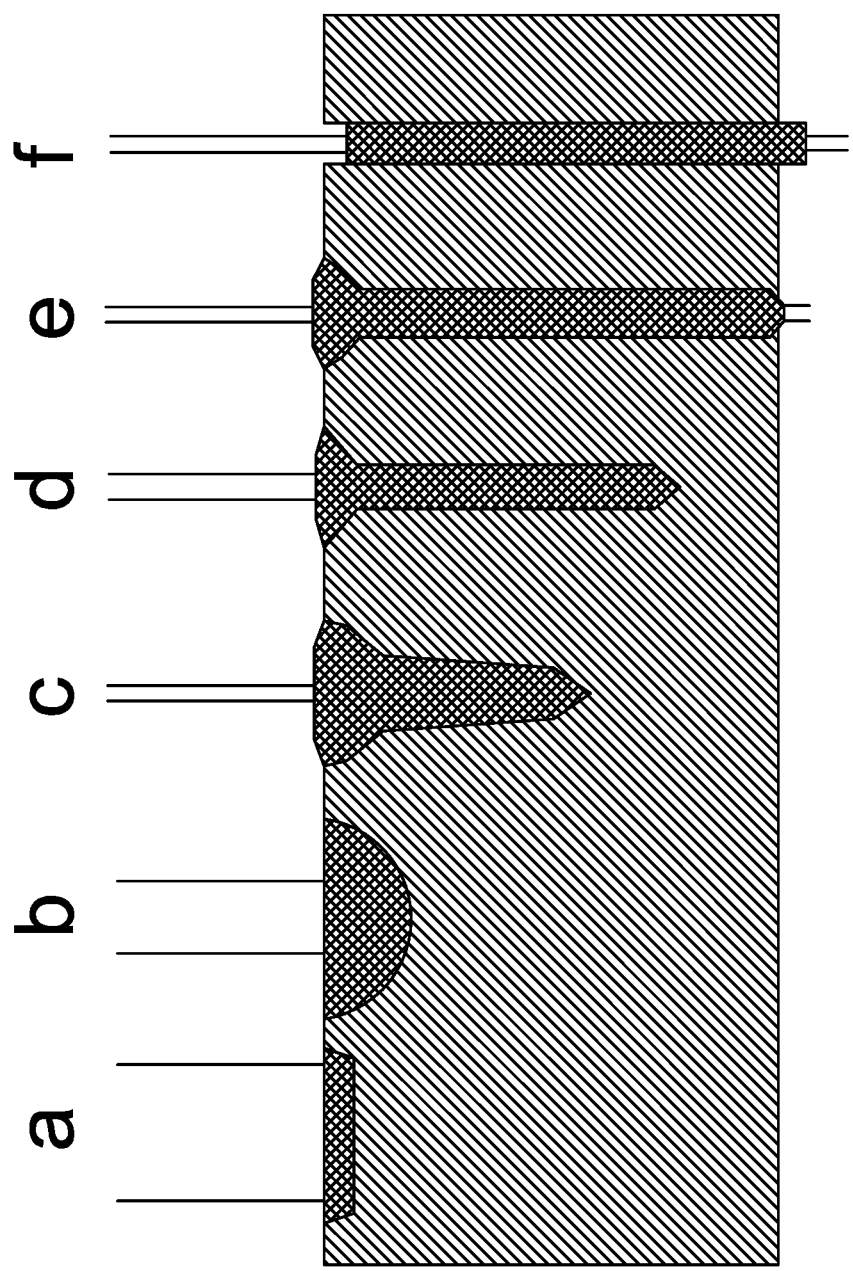
FIG. 7 shows how the shape of a weld can be changed by changing the properties of the electron beam.

As explained in greater detail below, when an electron beam or laser beam is used to fuse a turbine wheel to a shaft, the beam is directed radially at the weld joint, perpendicular to the axis of rotation of the shaft and wheel, and the shaft and wheel are rotated so that a weld is formed around the entire peripheral contact area as the shaft and wheel are turned. Electrons are produced by an electron gun, accelerated to high velocity, shaped into a beam by electrical fields, further collimated or made parallel, and then focused by an electromagnetic lens. This allows for the creation of extremely deep and narrow welds (see FIG. 7, welds "d", "e" and "f"). Since the beam is aimed perpendicular to the shaft, the conventional deep and narrow weld produces a planar disk-shaped joint zone, and accordingly the turbine wheel and shaft contact surfaces are shaped to contact each other in this planar disk-shaped zone, i.e., the shaft and wheel contact surfaces at this peripheral contact zone are planar.

Figure 1:
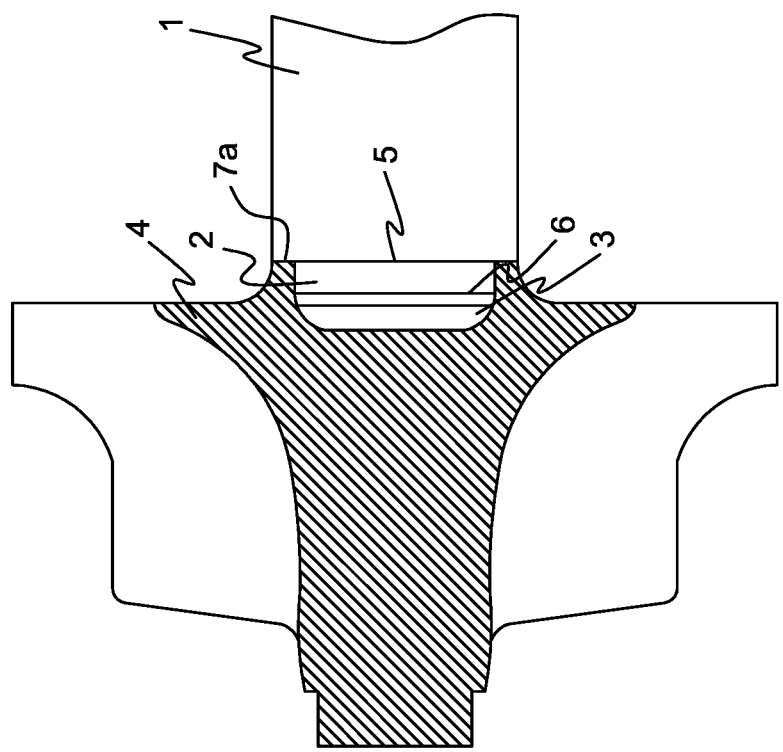
FIG. 1 depicts a conventional joint in which a turbine wheel and a turbine shaft are joined together along a plane perpendicular to the shaft axis.

As shown in FIG. 1, a conventional shaft 1 has a cylindrical centering protrusion 2 which can be inserted into a cylindrical receptacle 3 in the turbine wheel 4, leaving a gap 6. For axial location, the wheel and shaft contact along an abutment zone 5, wherein the contact surfaces are in a plane 7*a* perpendicular to the axis of rotation. For the reasons discussed above, until the present invention this had been considered an ideal method of forming a joint.

Figure 2:
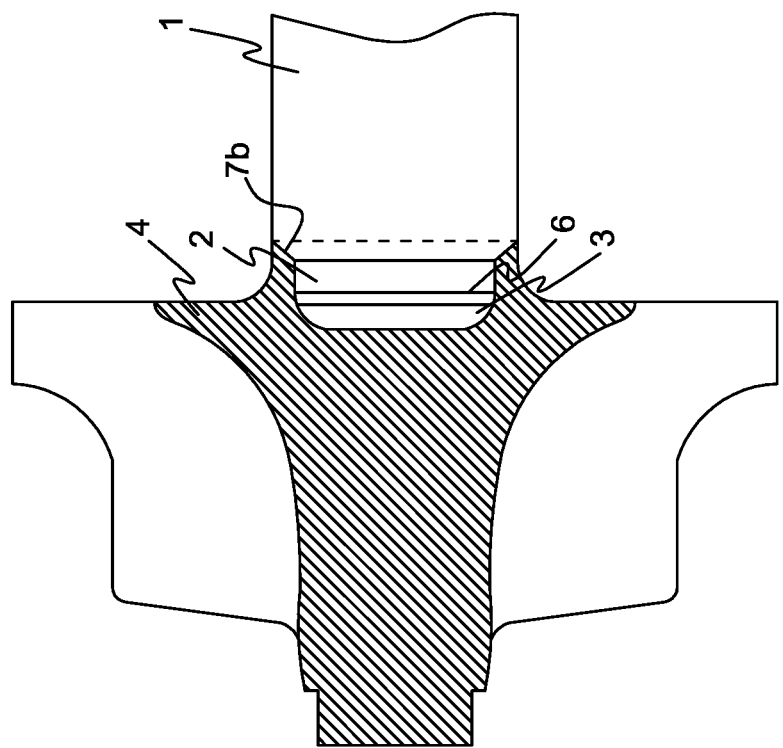
FIG. 2 shows the mating of a turbine wheel to shaft according to the present invention, with frustoconical contact surfaces prior to welding.

The present invention was made based on the discovery that the undesirable stresses constrained in this narrow planar joint zone can be largely dissipated by changing the design of the contact surfaces to an oblique or frustoconical configuration 7*b* as shown in FIG. 2 prior to welding. The peripheral contact zone of the shaft 1 is preferably beveled slightly, at an angle of at least 5° to the radial, more preferably at least 10°, most preferably approximately 15-25°, preferably less than 30°, and not to exceed 45°. The mating contact surface formed on the turbine wheel 4 is obtuse and complements the angle of the contact surface formed on the shaft, so that the surfaces abut flush against each other.

Figure 5:
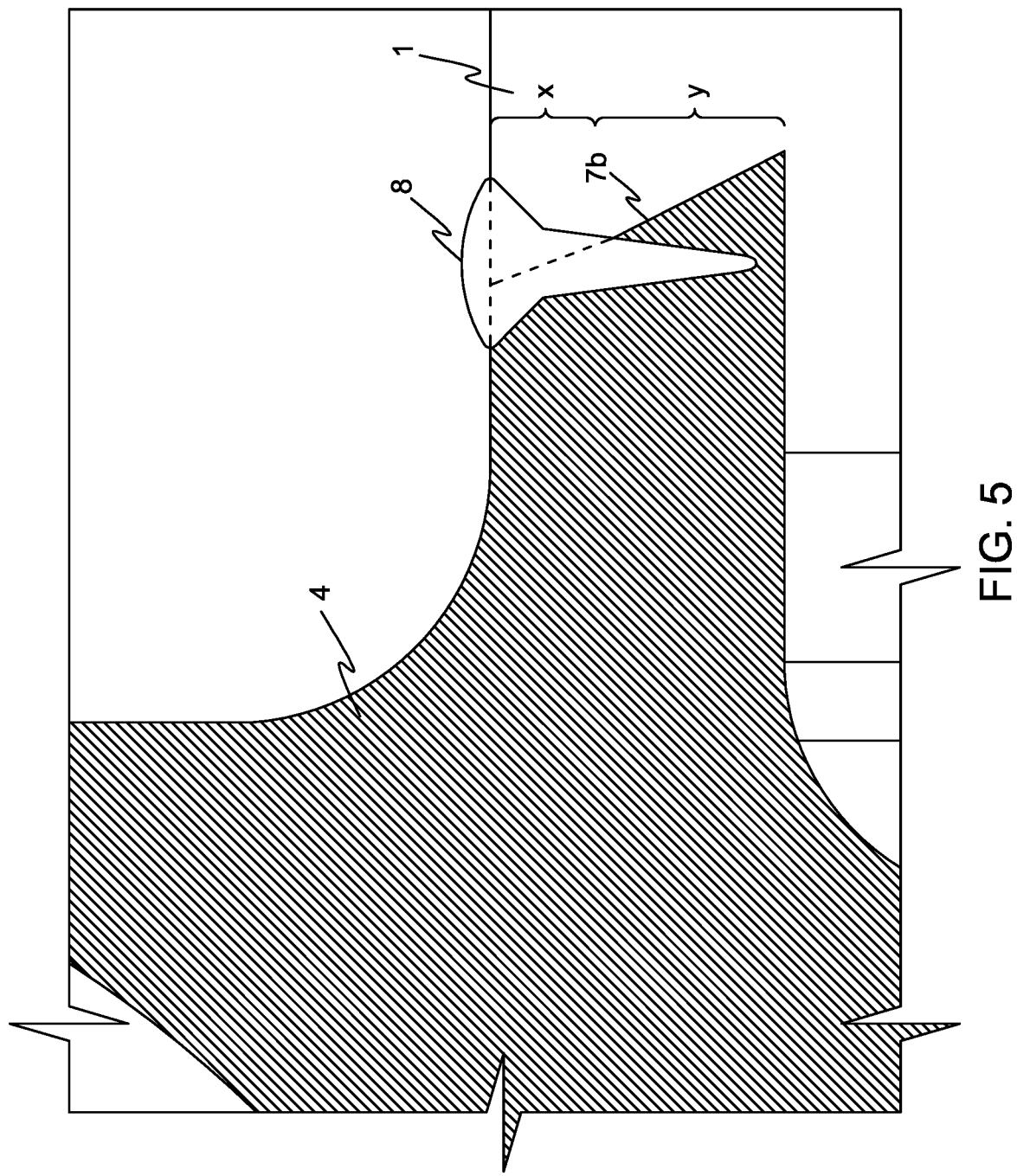
FIG. 5 shows an alternative embodiment, with weld root in the turbine wheel.

On the other hand, the tapering may be in the opposite direction, with the bevel formed on the turbine wheel at the contact zone, and the shaft provided with a reciprocal contact surface obtuse to the radial plane as shown in FIG. 5. The advantage of this embodiment is that the root of the weld is in the turbine wheel, which is generally of a harder material.

In either case, the contact surfaces are easily formed with conventional techniques, and the design does not require complex and redundant dimensioning of mating parts.

Figure 3:
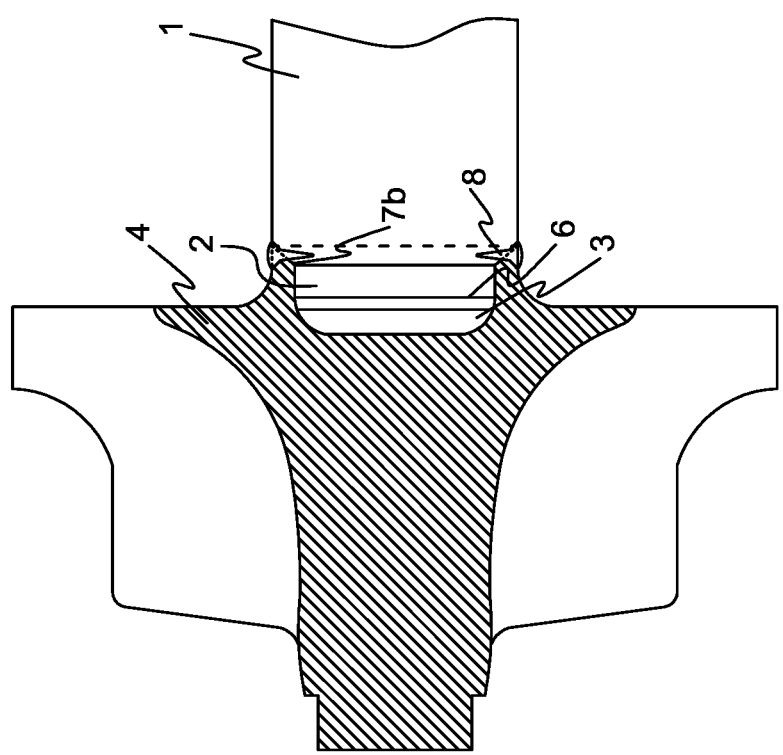
FIG. 3 shows the mating of a turbine wheel to shaft according to the present invention, with frustoconical contact surfaces after welding.
Figure 4:
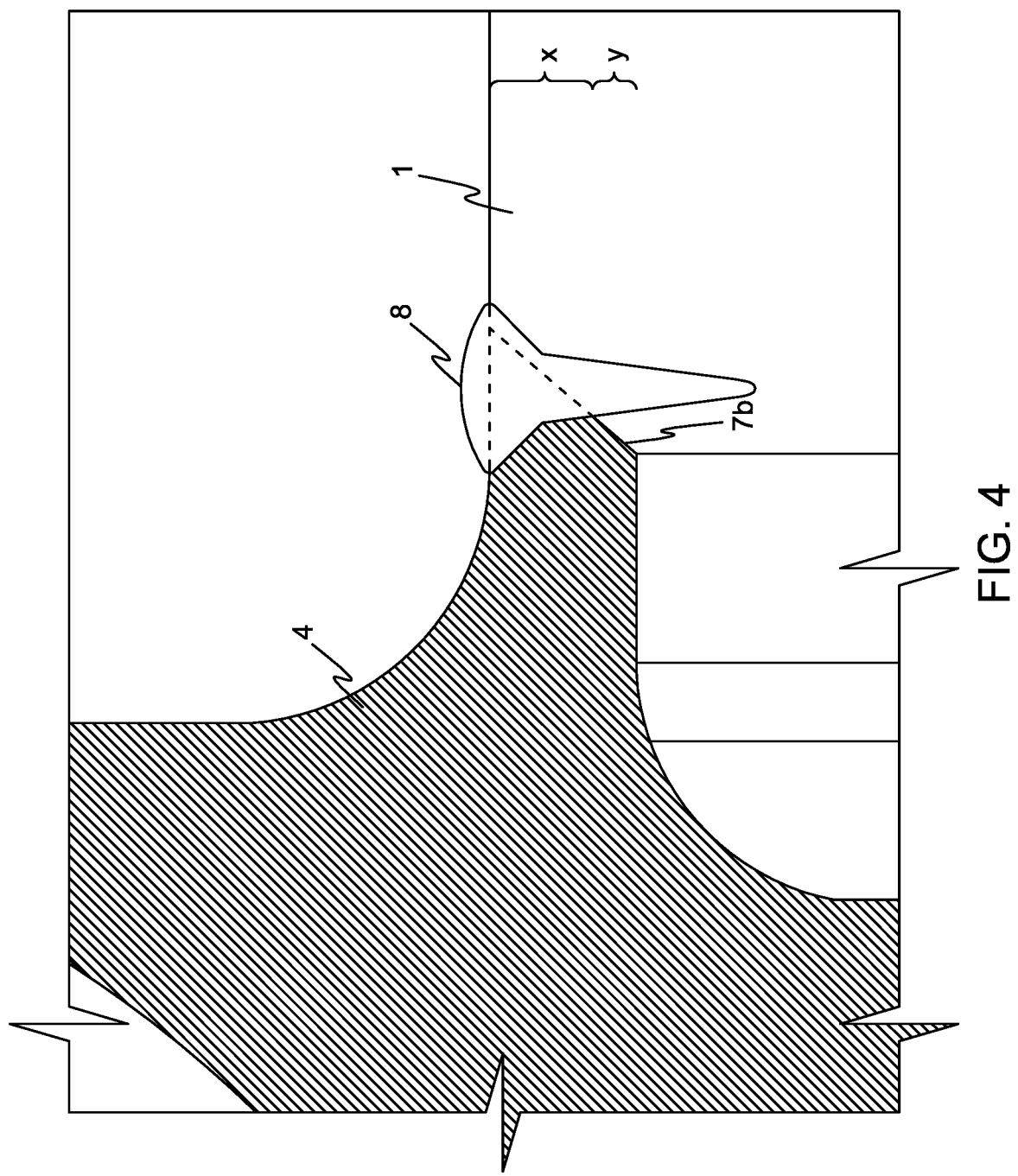
FIG. 4 is an enlarged representation of the weld taken from FIG. 3, showing weld root in the shaft.

The geometric configuration of the welding equipment is not changed, so that the EB or laser beam continues to impact the shaft and wheel perpendicular to the axis of rotation. However, the welding of the inventive oblique or frustoconical contact zone will require (a) that the weld seam is shifted axially, either towards the shaft (FIG. 4) or towards the wheel (FIG. 5) and (b) that instead of a deep and narrow weld (FIG. 7, welds "d", "e" and "f"), the beam is controlled to produce a weld having more width and less depth (FIG. 7, weld "c"; FIGS. 4 and 5) than the conventional deep and narrow weld. Preferably, the penetration depth of the melt is 2-3 times the width of the melt at the surface of the weld. The obliqueness of the contact zone and the shape and position of the weld are adjusted to each other so that the weld melts approximately the outer peripheral to ⅓ to ¾ of the contact zone, preferably about ½ to ⅔ of the peripheral contact zone, but does not melt the full length of the oblique contact zone. See FIG. 4, where the weld 8 of FIG. 3 is shown enlarged, with the shape of the outer diameter of the shaft and wheel and the contact zone prior to melting shown in dash lines. After melting, the metals of the turbine wheel and shaft become fused into weld 8. As can be seen, the radially inner section "y" of the contact zone is not melted, only the radially outer section of the contact zone "x" (wherein "x"+"y"=contact zone). This way, an area of firm contact of the oblique surfaces, which is not welded, is maintained. At the same time, the root notch—the location of elevated stresses—is situated in the material of the shaft (FIG. 4) or turbine wheel (FIG. 5). Furthermore, conventional cylindrical centering surfaces of the turbine wheel and for locating the parts radially also contribute to reliably centering the components during the welding process.

The shaft may be formed of the same material as the turbine wheel, or may be formed of a different material. For example, both the turbine wheel and shaft may be formed of a titanium alloy, or the shaft may be formed of an alloy steel such as AISI 8740 steel and the turbine wheel formed of a nickel based alloy such as the superalloy INCONEL 713. An intermediate or brazing compound may be provided between the turbine wheel and shaft to promote welding and bonding.

Preferably, the shaft is made of a lower-melting metal than the turbine wheel, so that the shaft will begin to melt before the turbine wheel. Optionally, the outer surface of the shaft is provided with a small ridge of extra material immediately adjacent the contact zone, which material melts before the turbine wheel melts, and fills any gaps in the contact zone. Excess material is removed in a post welding operation prior to balancing.

The adjustment of the beam to produce the desired width and depth of weld is within the skill of the ordinary person in this art. The effectiveness of the electron beam depends on many factors. The most important are the physical properties of the materials to be welded, especially the ease with which they can be melted under low-pressure conditions.

The heat contribution of single electrons is very small, but the electrons can be accelerated by very high voltages, and by increasing their number (the beam current) the power of the beam can be increased to any desired value. By focusing the beam onto a small diameter on the surface of a solid object, values of planar power density as high as $10^4$ up to $10^7$ W/mm$^2$ can be reached. Because electrons transfer their energy into heat in a very thin layer of the solid, the power density in this volume can be extremely high. The volume density of power in the small volume in which the kinetic energy of the electrons is transformed into heat can reach values of the order $10^5$-$10^7$ W/mm$^3$. Consequently, the temperature in this volume increases extremely rapidly, by $10^8$-$10^9$ K/s.

Figure 6B:
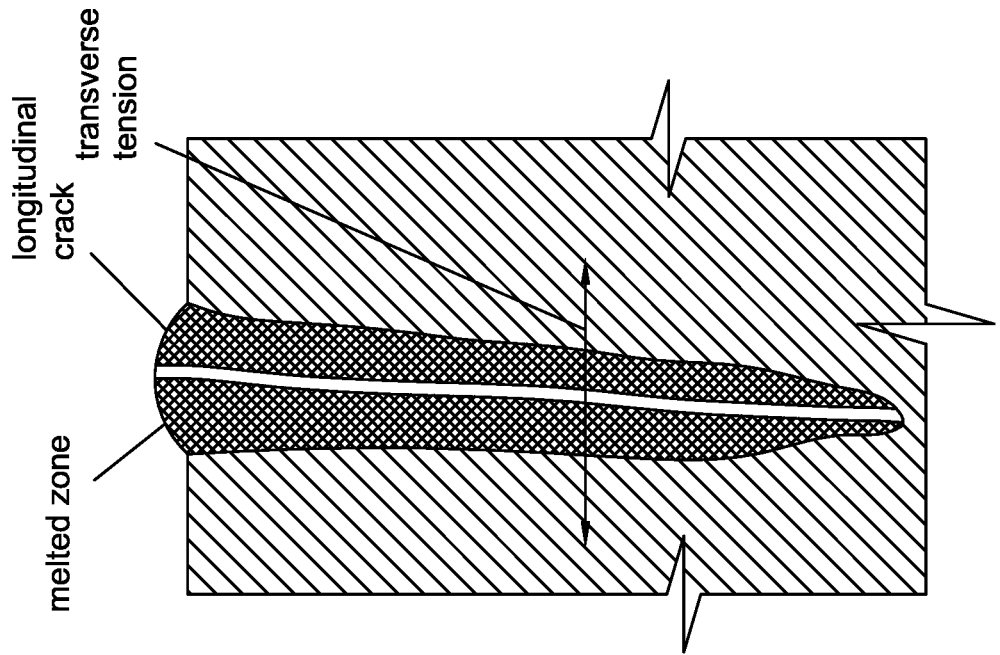
FIG. 6*a,b* show stress and crack formations possible in a weld formed by a conventional electron beam or laser weld.
Figure 6A:
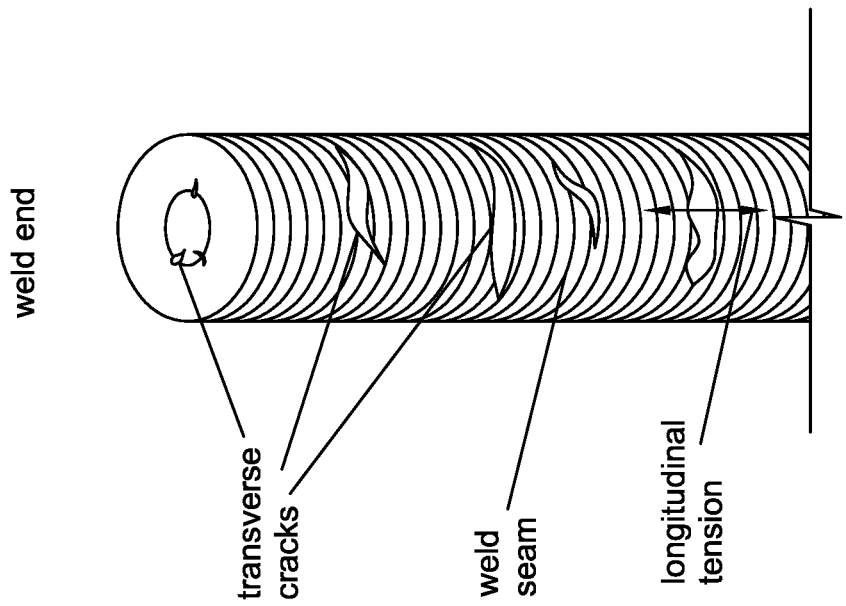

The electron beam can be controlled to produce various weld shapes as shown in FIG. 4. While the conventional "perpendicular" planar joint is preferably EB welded to produce a joint having the weld shape "d", "e" or "f" in FIG. 6, the present weld preferably has a shape more like weld shape "c" in FIG. 6.

The size and shape of the zone influenced by the beam depends on:

(1) Beam power—The power of the beam [W] is the product of the accelerating voltage [kV] and beam current [mA], parameters easily measurable and precisely controllable. The power is controlled by the beam current at constant accelerating voltage, usually the highest accessible.

(2) Power density (focusing of the beam)—The power density at the spot of incidence of the beam with the workpiece depends on factors like the size of the electron source on the cathode, the optical quality of the accelerating electric lens and the focusing magnetic lens, alignment of the beam, the value of the accelerating voltage, and the focal length. All these factors (except the focal length) depend on the design of the machine.

(3) Welding speed—The construction of the welding equipment should enable adjustment of the relative speed of motion of the workpiece with respect to the beam in wide enough limits, e.g., between 2 and 50 mm/s.

(4) Material properties, and in some cases also on (5) Geometry (shape and dimensions) of the joint.

The final effect of the beam depends on the particular combination of these parameters.

Action of the beam at low power density or over a very short time results in melting only a thin surface layer.

A defocused beam does not penetrate, and the material at low welding speeds is heated only by conduction of the heat from the surface, producing a hemispherical melted zone.

At high power density and low speed, a deeper and slightly conical melted zone is produced.

In the case of very high power density, the beam (well focused) penetrates deeper, in proportional to its total power.

A test of the new geometry of contact surfaces between a turbine wheel and shaft following welding and annealing confirmed that in practice initial unbalance was improved.

Although a new geometry of contact surfaces between a turbine wheel and shaft has been described herein with great detail with respect to an embodiment suitable for the automobile or truck industry, it will be readily apparent that the joined turbine wheel and shaft, and the process for production thereof, are suitable for use in a number of other applications, such as aircraft or fuel cell powered vehicles. Although this invention has been described in its preferred form with a certain of particularity with respect to an automotive internal combustion engine exhaust driven turbine wheel and shaft of a turbocharger, it is understood that the present disclosure of the preferred form has been made only by way of example and that numerous changes in the details of structures and the composition of the combination may be resorted to without departing from the spirit and scope of the invention.

Now that the invention has been described, we claim:

1. A method for joining a turbocharger turbine wheel to a shaft, the method comprising:

providing on one end of the shaft, the shaft having a shaft axis, the shaft having an outer diameter, a frustoconical contact surface extending to the outer diameter of the shaft, providing on the turbine wheel a complementary mating contact surface, contacting the contact surfaces of the turbine wheel and shaft along a contact zone having a depth (x+y) from the shaft outer diameter, the contact zone comprising a radially outer section (x) and a radially inner section (y), electron beam or laser beam welding the turbine wheel and shaft, wherein the turbine wheel is joined to the shaft by melting and fusing the radially outer section of the contact zone (x), and wherein the radially inner section of the contact zone (y) is not melted.

2. A method for joining a turbocharger turbine wheel to a shaft, the method comprising:

providing on one end of the shaft, the shaft having a shaft axis, the shaft having an outer diameter, a frustoconical contact surface extending to the outer diameter of the shaft, providing on the turbine wheel a complementary mating contact surface, contacting the contact surfaces of the turbine wheel and shaft along a contact zone having a depth from the shaft outer diameter of (x+y), the contact zone comprising a radially outer section (x) and a radially inner section (y), and electron beam or laser beam welding the turbine wheel and shaft, wherein the turbine wheel is joined to the shaft by melting and fusing the radially outer section (x) of the contact zone, and wherein the radially inner section of the contact zone (y) is not melted, wherein the radially outer section (x) of the contact zone extends from the shaft outer diameter to ⅓ to ¾ of the contact zone depth (x+y).

3. The method according to claim 2, wherein the radially outer section (x) of the contact zone extends from the shaft outer diameter to ½ to ⅔ of the contact zone depth (x+y).

4. The method according to claim 1, wherein the contact surfaces are at an angle of from 5° to 45° relative to a plane perpendicular of the shaft axis.

5. The method according to claim 1, wherein the contact surfaces are at an angle of from 10° to 30° relative to a plane perpendicular to the shaft axis.

6. The method according to claim 1, wherein the contact surfaces are at an angle of from 15° to 25° relative to a plane perpendicular to the shaft axis.

7. The method according to claim 1, wherein the turbine wheel has a turbine wheel axis, wherein an angle between the frustoconical contact surface and the shaft axis is less than 85° and an angle of the complementary frustoconical contact surface of the turbine wheel axis is greater than 95°.

8. The method according to claim 1, wherein the turbine wheel has a turbine wheel axis, wherein an angle between the frustoconical contact surface and the shaft axis is greater than 95° and an angle of the complementary frustoconical contact surface of the turbine wheel axis is less than 85°.

9. The method according to claim 1, wherein the electron beam or laser beam welding forms a weld having a depth and a width at the welded wheel and shaft surface, wherein the depth of the weld is from 2 to 3 times the width of the weld at the welded wheel and shaft surface.

10. A turbocharger turbine wheel and shaft assembly, produced by the method according to claim 1.

* * * * *